(12) United States Patent
Malsam et al.

(10) Patent No.: US 8,317,114 B1
(45) Date of Patent: Nov. 27, 2012

(54) DUAL SPAN CENTER PIVOT IRRIGATION SYSTEM

(75) Inventors: Craig S. Malsam, Omaha, NE (US); Ron Flakus, Las Vegas, NV (US)

(73) Assignee: Valmont Industries, Inc., Omaha, NE (US)

( * ) Notice: Subject to any disclaimer, the term of this patent is extended or adjusted under 35 U.S.C. 154(b) by 1454 days.

(21) Appl. No.: 11/284,296

(22) Filed: Nov. 21, 2005

(51) Int. Cl.
*B05B 3/00* (2006.01)
(52) U.S. Cl. .......................... 239/729; 239/730
(58) Field of Classification Search ................. 239/729, 239/722, 723, 738, 730–733, 69
See application file for complete search history.

(56) References Cited

U.S. PATENT DOCUMENTS

| | | | | |
|---|---|---|---|---|
| 3,724,758 A | * | 4/1973 | Fizmaurice | 239/251 |
| 3,802,627 A | * | 4/1974 | Seckler et al. | 239/729 |
| 3,901,442 A | * | 8/1975 | Chapman | 239/99 |
| 4,432,494 A | * | 2/1984 | Hunter | 239/729 |
| 4,442,976 A | | 4/1984 | Noble | |
| 5,572,954 A | * | 11/1996 | Elkins | 119/502 |

* cited by examiner

*Primary Examiner* — Davis Hwu
(74) *Attorney, Agent, or Firm* — Advent IP, P.C., L.L.O.

(57) ABSTRACT

A dual span center pivot irrigation system comprising first and second center pivot span structures pivotally secured at their inner ends to a fixed center pivot structure. Each of the center pivot span structures are independently operable with the movements thereof being coordinated by suitable controls. The center pivot span structures may be operated in at least three different modes, namely: (1) independent wiper; (2) follow the leader; and (3) independent full circle.

1 Claim, 6 Drawing Sheets

DUAL SPAN CENTER PIVOT IRRIGATION SYSTEM

BACKGROUND OF THE INVENTION

1. Field of the Invention

This invention relates to a dual span center pivot irrigation system and more particularly to the controls for independently operating and coordinating the movement of each of spans of the center pivot irrigation system relative to one another in at least three different modes. Each of the center pivot span structures is pivotally secured to a fixed center pivot structure and is supported upon one or more self-propelled drive units for pivotally moving the span structure relative to the center pivot structure.

2. Description of the Related Art

Optimal plant husbandry requires adherence to the art of irrigation with a fair degree of precision. While established plants can tolerate over watering and under watering to a certain degree, seeds and seedlings are not so tolerant. Efficient farming practices demand a very specific seed density with a relatively high germination rate. Improper irrigation results in gaps or irregularities in seed density, and improper watering of the seeds will have a deleterious effect in achieving a proper germination rate.

Extremely small seeds, such as carrot seeds, have a very poor germination rate using conventional irrigation techniques. The primary problem associated with the conventional irrigation techniques with respect to small seeds involves controlling the amount of irrigation liquid (e.g., water) and its effect on the seed exposed on a surface for germination. Because the very small seeds are unduly influenced by heavy water application, small seeds will fail to stay in a designated spot and will wash away with the irrigation water, thereby increasing the seed density in one area to the exclusion of other areas There are two basic types of conventional irrigation, Center Pivot and Solid Set. In a conventional center pivot irrigation system, a fixed center pivot structure is provided which includes a vertically disposed water supply pipe supported thereon which is in communication with a source of irrigation water under pressure. The center pivot span structure is pivotally secured at its inner end to the center pivot structure and includes a water delivery pipe supported on one or more self-propelled drive units with the inner end of the water delivery pipe being in fluid communication with the vertically disposed water supply pipe. In operation, the center pivot span structure pivots or rotates in a circle, or portions thereof, about the fixed center pivot structure. Inasmuch as the center pivot span structure rotates in a 360-degree circle, in normal situations, one revolution of the center pivot span structure results in a complete irrigation of the underlying area contained beneath the span structure. One complete revolution of the center pivot span structure normally consumes a considerable amount of time such that successive passes over the same area will not occur frequently enough for small seeds and the seedlings growing therefrom. Thus, the farmer is faced with the difficult choice of applying a relatively fine mist of water to the delicate seeds on an intermittent basis and hoping that a high germination rate results therefrom. Inasmuch as soil can only absorb the irrigation liquid at a certain rate, the farmer is limited with respect to the amount of water that may be dispensed on a single pass versus the amount of time that successive passes can occur with a single center pivot span structure. Thus, the dilemma heretofore faced by the farmer is the delicate balancing of a spray rate per single pass of a single center pivot span structure versus the absorption capability of the underlying soil and the seed size to retain the seed in the desired location while preventing the washing of soil or other matter which will cover up the seeds.

In a conventional Solid Set irrigation system, an irrigation pipe network placed above ground throughout the filed is provided which includes evenly space vertical pipes, typically terminated with impact sprinklers place at a height slightly above a mature crop canopy. The irrigation pipe network is in communication with a source of irrigation water under pressure. In operation, a valve is opened allowing water to be distributed though the pipe network and impact sprinklers. Due to the design of impact sprinklers, prior to full water pressure in the pipe, the water distributed through the impact sprinklers floods or "dribbles" onto the field. In a similar manner, as the water pressure is turned off, instead of instantly shutting off the water distribution through the impact sprinklers, the water floods or "dribbles" onto the field as water pressure is lost. The effects of turning water ON and OFF through the impact sprinklers of Solid Set irrigation results in a redistribution of small seedlings know as washout. Because the irrigation pipe network is located above ground, this wash-out effect can also be the result of a break in the pipe network. Also associated with a conventional Solid Set irrigation system is the associated labor. Because the irrigation pipe network is located above ground, the network must be assembled and disassembled at various times throughout the growing season to accommodate various cultivation and harvesting equipment.

In the pending provisional application Ser. No. 60/651,011 filed Feb. 8, 2005, and entitled IRRIGATION SYSTEM HAVING TWO OR MORE SPANS EXTENDING FROM A CENTER PIVOT STRUCTURE, several patents were discussed in the Background of the Invention portion of the application. None of/the prior art patents disclosed in the pending application involves the use of two or more center pivot span structures which pivotally extend outwardly from a center pivot structure and which are independently driven. In the provisional application, a disclosure is made of two or more center pivot span structures pivotally secured to a fixed center pivot structure and which extend outwardly therefrom with the span structures being independently driven to achieve the desired irrigation of small seeds or the like. Although the concept of two or more center pivot span structures extending outwardly from a center pivot structure is disclosed in the provisional application, the control means and the operational safeties involved therewith were not disclosed in detail. The subject of this invention is the control means and the safeties associated therewith for operating at least a pair of center pivot span structures which radially extend outwardly from a center pivot structure with the center pivot span structures being operated in various modes such as: (1) independent wiper; (2) follow the leader; and (3) independent full circle.

SUMMARY OF THE INVENTION

A center pivot irrigation system is disclosed comprising a fixed center pivot structure including a vertically extending water supply pipe having upper and lower ends. The water supply pipe is fluidly connected to a source of irrigating water under pressure. The system also includes at least first and second center pivot span structures having inner and outer ends. The inner end of the first span structure is operably pivotally secured and fluidly connected to the water supply pipe at the upper end thereof with the first span structure including at least one self-propelled drive unit for pivotally moving the first span structure with respect to the center pivot structure. The inner end of the second span structure is also operably pivotally secured and fluidly connected to the water supply pipe below the connection of the first span structure to the water supply pipe. The second span structure also includes at least one self-propelled drive unit for pivotally moving the second span structure with respect to the fixed center pivot structure. The first and second span structures are independently pivotally movable with respect to the center pivot structure.

In one operating mode of the system, one of the span structures follows the other span structure based on maintaining a user-defined angle. In another mode of operation of the system, each of the span structures moves in partial circles in an independent wiper manner. In another mode of operation of the system, the span structures are operated in independent full circles. A control means is provided for operating the span structures including operational safeties: (1) maintaining the proper included angle between the span structures; (2) to prevent the systems from coming too close to one another; and (3) to prevent the collision of the span structures.

It is therefore a principal object of the invention to provide an improved center pivot irrigation system which includes two or more center pivot span structures extending outwardly from a fixed center pivot structure together with the means for independently operating and controlling the operation of the span structures.

Still another object of the invention is to provide a system of the type described wherein irrigating water is not delivered through the water delivery pipe on one of the span structures when that span structure is not moving.

Still another object of the invention is to provide a center pivot irrigation system of the type described including a control means having a safety which provides for user defined irrigation control of the two independently moving span structures, ensures that the span structures will be properly spaced from one another during the operation of the same and shuts down the entire system if the span structures move into a position wherein they are too close together.

Yet another object of the invention is to provide a center pivot irrigation system of the type described which may be operated in at least three modes, namely: (1) independent wiper; (2) follow the leader; and (3) independent full circle.

Yet another object of the invention is to provide a control means for a center pivot irrigation system of the type described which ensures that the seeds being irrigated will not be under watered or over watered, eliminates or reduces "wash-out" and eliminates the labor costs associated with the means of irrigation known as Solid Set.

These and other objects will be apparent to those skilled in the art.

DETAILED DESCRIPTION OF THE INVENTION

The numeral 10 refers to the center pivot irrigation machine of this invention. Machine 10 includes a center pivot structure 12 which supports a vertically disposed water supply pipe 14 which is in communication with a source of irrigation water under pressure. The upper end of water supply pipe 14 is provided with a plurality of radially spaced openings formed therein such as disclosed in the provisional application. A T-shaped connector 16 comprising a vertically disposed portion 18 and a horizontally extending portion 20 has its vertically disposed portion 18 rotatably embracing the upper end of water supply pipe 14 whereby the interior of the vertically disposed portion 18 is in communication with the radially spaced openings so that water may not only exit the upper end of the vertically disposed portion 18 of T-shaped connector 16 but may also pass outwardly from the outer end of the horizontally extending portion 20 of T-shaped connector 16.

Figure 1:
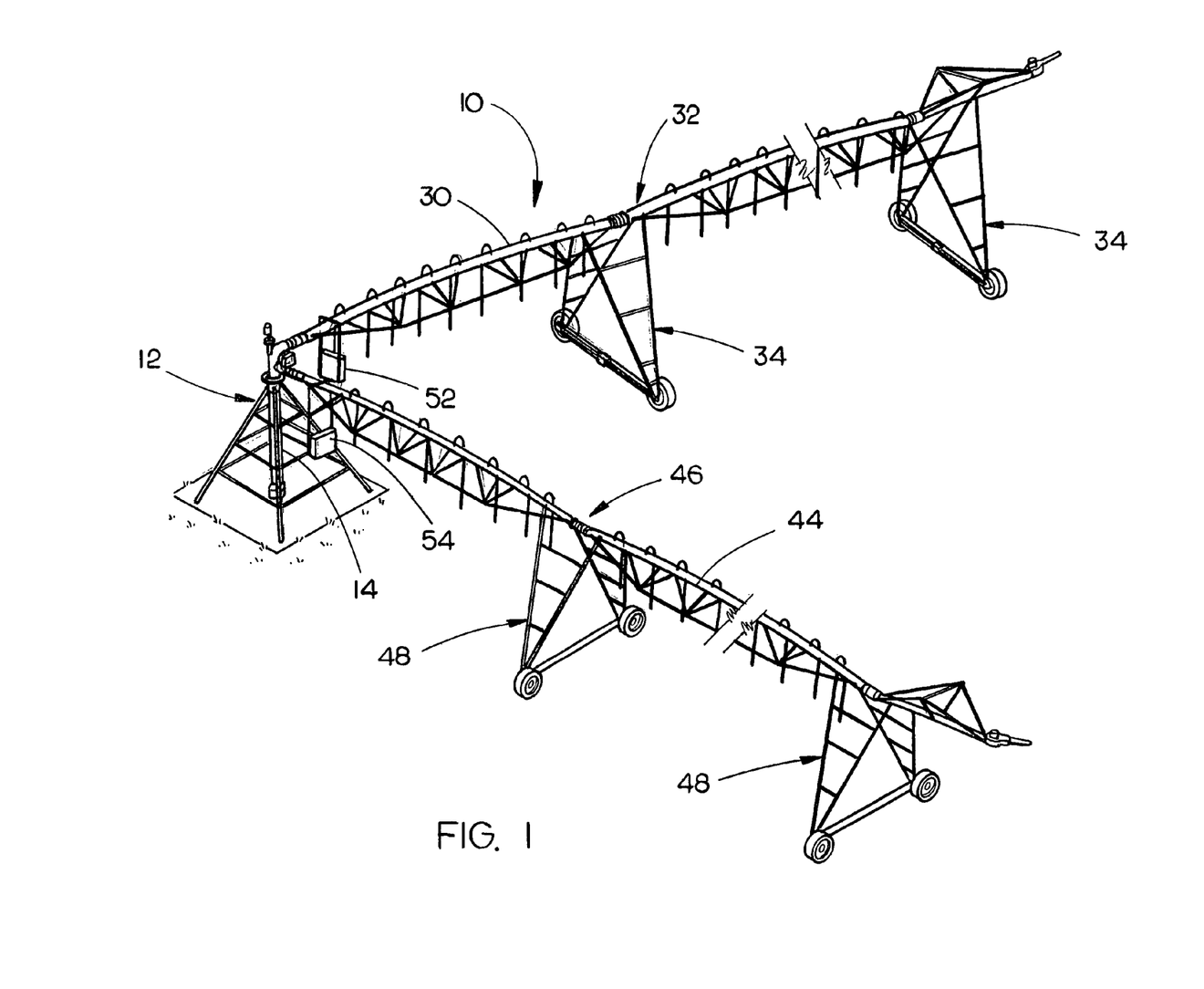
FIG. 1 is a partial perspective view of the dual span center pivot irrigation system of this invention.
Figure 2:
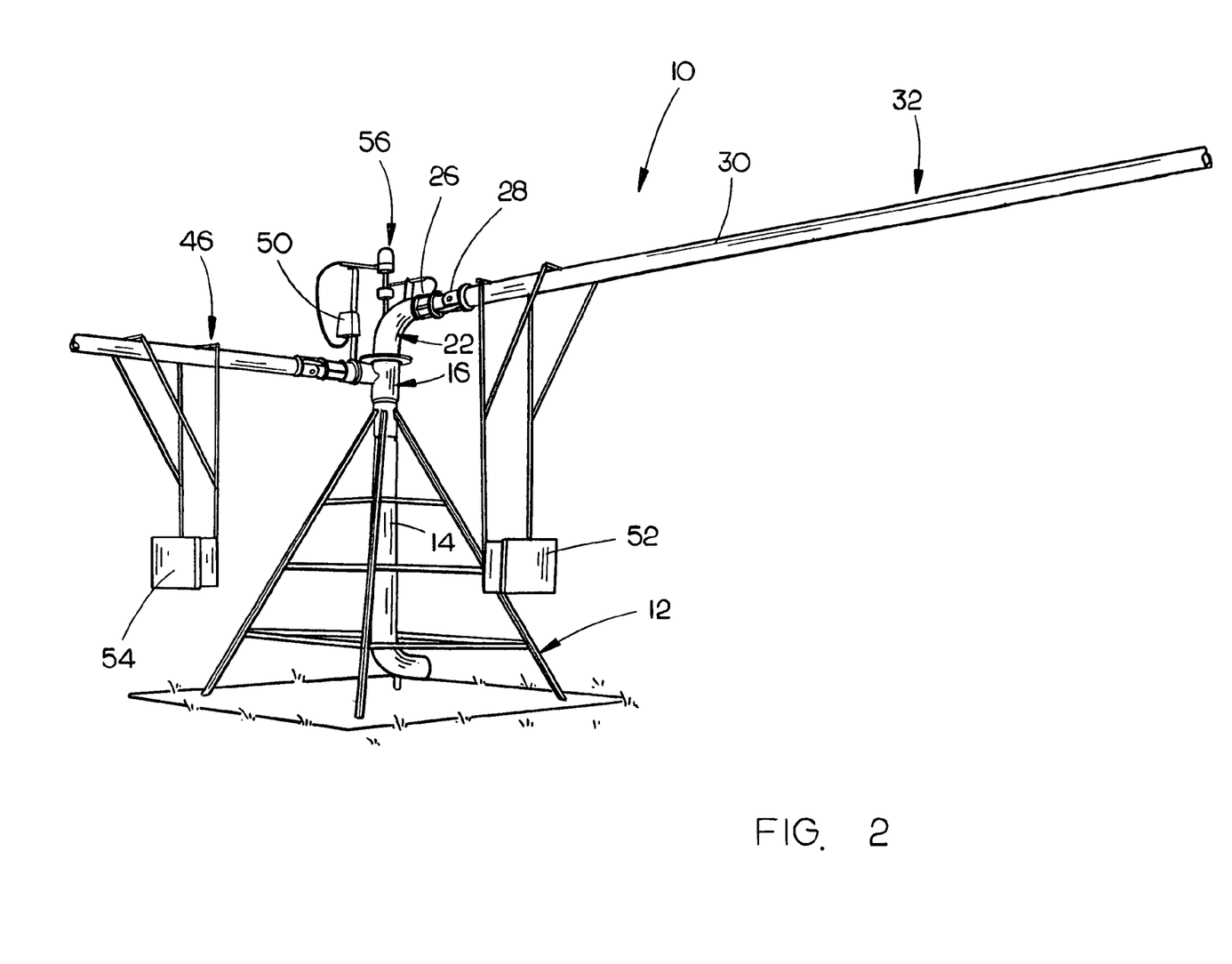
FIG. 2 is a perspective view of the fixed center pivot structure and the inner ends of the dual spans.
Figure 3:
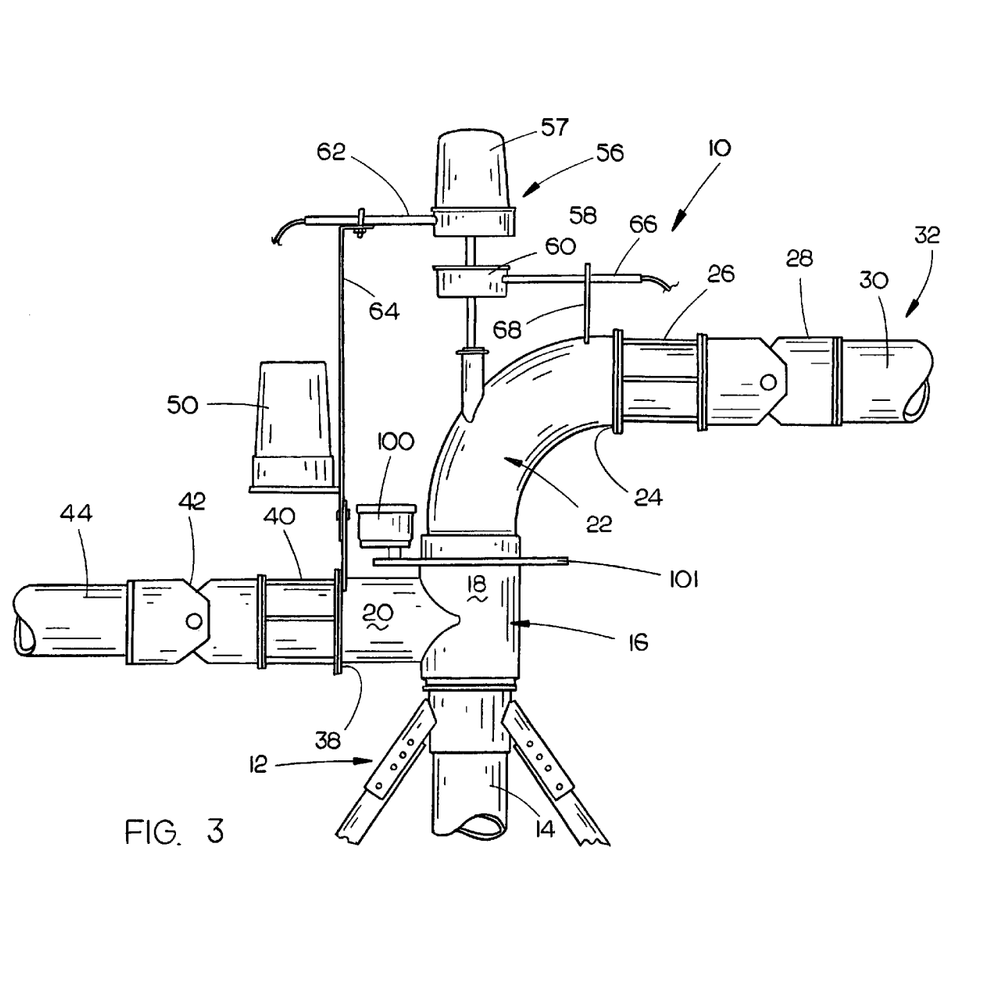
FIG. 3 is a partial side view of the upper end of the center pivot structure and the inner ends of the dual spans.
Figure 4:
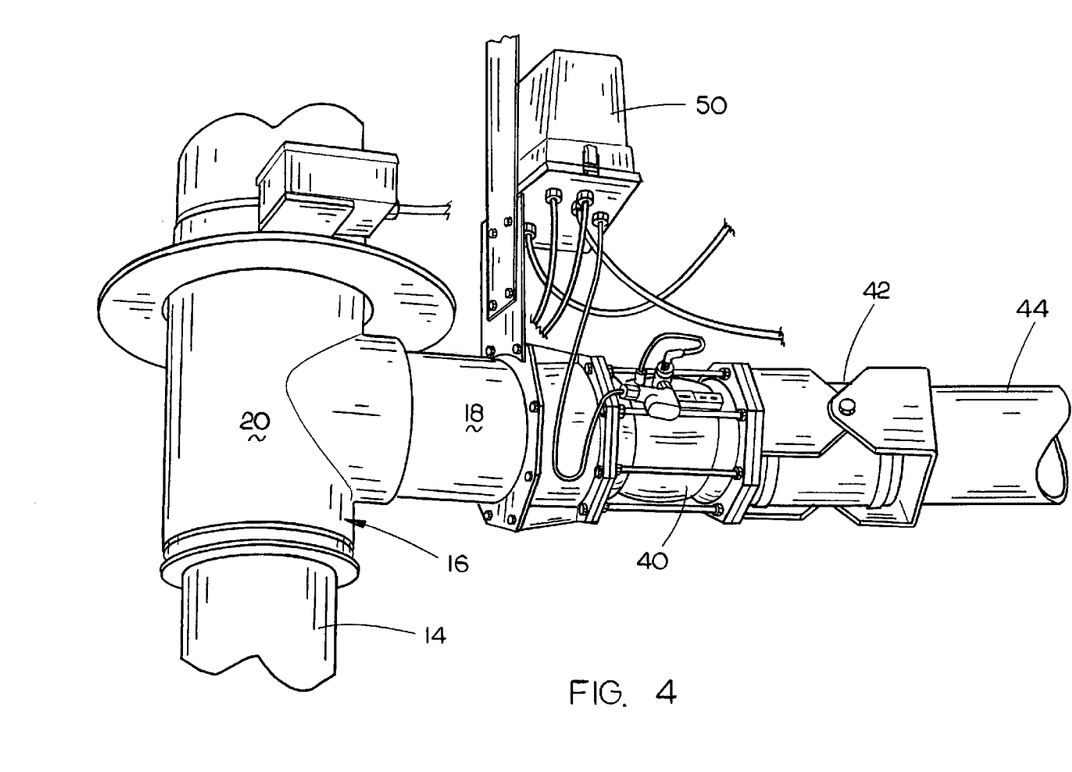
FIG. 4 is a partial perspective view of the inner end of one of the span structures.

The lower end of a conventional elbow connector 22 is rotatably connected to the upper end of water supply pipe 14 in conventional fashion. The outer end of elbow connector 22 is provided with a flange 24 (FIG. 3) thereon to which is bolted an electrically operated shut-off valve 26. A conventional pivot flex 28 is bolted to the outer end of the valve 26 and has the inner end of a water delivery pipe 30 bolted thereto and which extends radially outwardly from the center pivot structure 12 in conventional fashion. The water delivery pipe 30 is comprised of a plurality of pipe sections bolted together in an end-to-end relationship to form a first center pivot span structure 32 which includes a plurality of spaced-apart, self-propelled drive units 34 which are adapted to move the first center pivot span structure 32 with respect to the center pivot structure in conventional fashion. The first center pivot span structure 32 includes conventional alignment structure thereon for maintaining the span structure 32 in an aligned condition in conventional fashion. An electrical junction box 50 is at the inner end of span structure 32 for conveying electrical power to the drive units 34 from the center pivot structure 12. Although the shut-off valve 26 is disclosed as being positioned inwardly of the pivot flex 28, those positions could be reversed if so desired.

The horizontally disposed portion 18 of connector 16 is provided with a flange 38 to which is bolted an electrical water shut-off valve 40. A pivot flex 42 of conventional design is mounted to the outer end of the valve 40 and has the inner end of a water delivery pipe 44 secured thereto which extends radially outwardly therefrom. Water delivery pipe 44 is comprised of a plurality of pipe sections bolted together in an end-to-end relationship to form a second center pivot span structure 46 which includes a plurality of spaced-apart self-propelled drive units 48 for propelling the second center pivot span structure 46 with respect to the center pivot structure 12. An electrical junction box 50 is secured to the side of pivot flex 42 for supplying electrical power from the center pivot structure 12 to the second center pivot span structure 46. The junction box 50 also supplies electrical power and electrical signals to control panels 52 and 54 which are suspended from the inner ends of the span structures 32 and 46.

The numeral 56 refers to a collector ring and resolver assembly positioned above the center pivot structure 12. Assembly 56 includes a collector ring 57 and resolvers 58 and

60. Resolver 60 provides the angular position of span structure 32 to control panel 52. Resolver 58 provides the angular position of span structure 44 to panel 54. The collector ring and resolver assembly 56 has a horizontally extending tube 62 extending therefrom which has electrical conduit extending therethrough and which is connected to the span structure 46 by a support 64 whereby pivotal movement of the span structure 46 will cause collector ring and resolver assembly 56 to rotatably move. The resolver assembly is designed to function as an angle sensor and senses the angle of the span structure 46 with respect to a user-defined reference zero angle. Similarly, a tube 66 extends from resolver 60 and has a conduit extending therethrough with the tube 66 being secured to the span structure 32 by means of a support 68. The resolver 60 is designed to function as an angle sensor and senses the angle of the span structure 32 with respect to a user-defined reference zero angle.

The control system of this invention is comprised of two control panels, one control panel 54 to control the operations of span structure 46, and a second control panel 52 to control the operations of span structure 32. The control system is designed to operate the two spans in the following modes: (1) independent wiper; (2) follow the leader; and (3) independent full circle. These operating modes are achieved by providing constant communications between control panels 52 and 54 via a communications bus, preferably RS485, allowing the transfer of all critical operating parameters and control including, but not limited to, speed, direction and position. During start-up and initialization, one control panel is designated the Primary Control panel and the other is designated the Secondary Control panel. The Primary Control panel is considered the Master Control and can modify or adjust the operating parameters of the secondary control panel to meet the operating requirements of the three operating modes.

Figure 7:
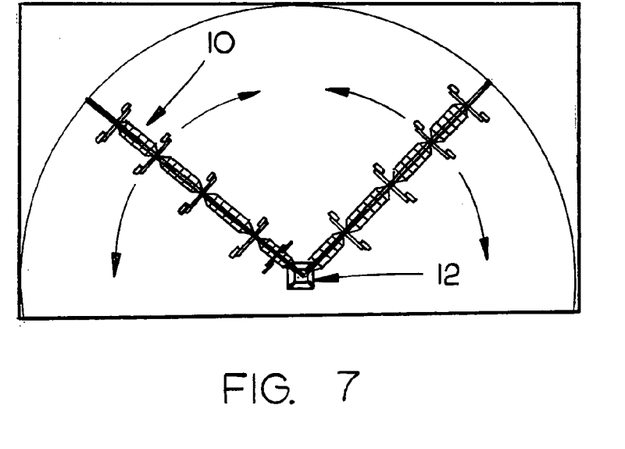
FIG. 7 is a view similar to FIGS. 6 and 7 except that the system is shown as being operated in an independent wiper mode.

In the independent wiper mode of FIG. 7, both of the spans 32 and 46 operate independently, but in part circles only. A preset safety angle will control how close the spans can come together. More particularly, the requirements of the independent wiper mode are as follows: 1. If a span structure is operating within its sector and the safety angle is reached, meaning the two span structures are too close, the span structure shall set its direction to move away from the other span structure. 2. If both span structures are operating and moving in the same direction and the safety angle is reached, the span structure that is coming from behind will pause. 3. If both span structures are operating but in opposite directions and the safety angle is reached, the span structure that is furthest from its programmed "reverse" or AR position will pause. 4. When a span structure is paused, the water shut-off valve associated therewith is closed to prevent over watering.

Figure 6:
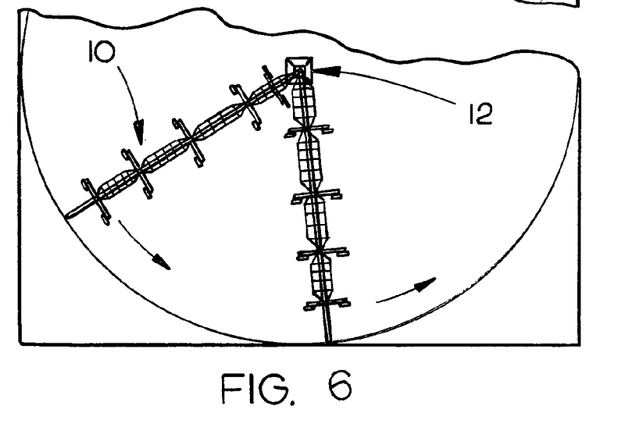
FIG. 6 is a view similar to FIG. 6 except that the system is shown to be operating in the follow the leader mode.

In the follow the leader mode of FIG. 6, the primary span structure will run based on its percent timer setting or based upon a running program. The secondary span structure will follow or lead (based on direction of travel) the primary span structure based on maintaining a user-defined angle.

More particularly, the start-up requirements of the follow the leader mode are as follows: 1. When Follow the Leader mode is turned 'ON' the other modes will be turned off, so that only one mode can be on at one time. 2. During initial startup of Follow the Leader mode, the primary span structure must pause with the water shut-off valve off while the secondary span structure moves into the trailing position by running at 100% in the appropriate direction. 3. Once the secondary span structure is in the trailing position, if water is to be on, the span structures open both water shut-off valves (open by default). 4. Both span structures will go into waiting, then running once pressurized. 5. Speed and direction of the secondary span structure will be set to match the primary span structure and will be locked out of user control at the secondary span structure. If the user tries to change these, the secondary module will display on the bottom line "PRIMARY PANEL CONTROL ONLY". 6. The secondary span structure will not have independent start control. It will be started only when the primary panel is started. If the user tries to start the secondary span structure, it will display on the bottom line "PRIMARY PANEL CONTROL ONLY". 7. The secondary's main status screen shall display the same percent timer value as is displayed on the primary's main status screen. This percent timer value will be the percent timer value entered by the user on the primary system. 8. When operating in the forward direction, the secondary span structure shall trail the primary span structure by a user-defined angle. 9. When operating in the reverse direction, the secondary span structure shall lead the primary span structure by a user-defined angle. 10. If the angle between the span structures is less than or equal to the Safety Angle, the span structure that is coming from behind will pause until the span structures are a predefined minimum or "safe" distance apart.

The control of the follow the leader mode is achieved as follows: 1. Speed and direction of the secondary module will be set from the primary module and locked out of user control at the secondary module. If the user tries to change these, the secondary module will display on the bottom line "PRIMARY PANEL CONTROL ONLY". 2. The direction of the secondary span structure will need to match the primary span structure. 3. The software will maintain this trail angle by adjusting the speed of the secondary span structure. 4. Trail angle is the angle between the primary and secondary span structures as provided by collector ring and resolver assembly 56 and by resolver assembly 60.

Figure 5:
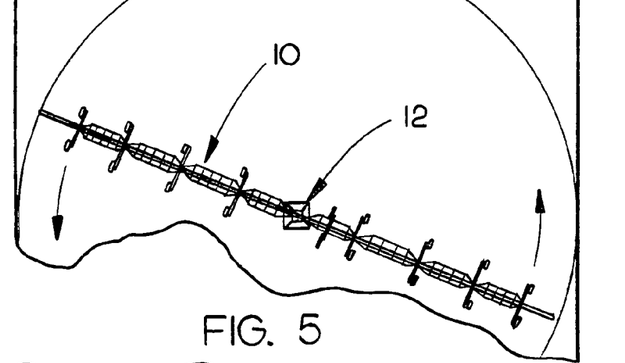
FIG. 5 is a partial plan view of the system operating in the independent full circle mode.

In the independent full circle mode of FIG. 5, both span structures operate independently, however always moving in the same direction. A preset safety angle will control how close the spans can come together. If the secondary span structure comes too close to the primary span structure, the secondary span structure will pause with valve off until the preset "wait" angle is reached. If the primary span structure gets too close to the secondary span structure, the primary span structure will pause with valve OFF until the preset "wait" angle is reached. The same will happen in either direction.

The requirements of the independent full circle mode are as follows: 1. When Independent Full Circle mode is turned 'ON', the other modes will be turned off, so that only one mode can be on at one time. 2. Direction of the secondary module will be set from the primary module and locked out of user control at the secondary module. If the user tries to change these, the secondary module will display "PRIMARY PANEL CONTROL ONLY". 3. The direction of the secondary span structure will need to match the primary span structure. 4. If the secondary span structure approaches the primary span structure, the secondary span structure will pause with valve off until the minimum safety angle or minimum distance between the span structure is reached. The primary span structure will continue on. 5. If the primary span structure approaches the secondary span structure, the primary span structure will pause with its water valve off until the minimum safety angle or minimum distance between the span structures is reached. The secondary span structure will continue on. 6. If a span structure is operating and the other span structure is stopped and the Safety Angle is reached, the operating span structure shall stop.

Figure 8:
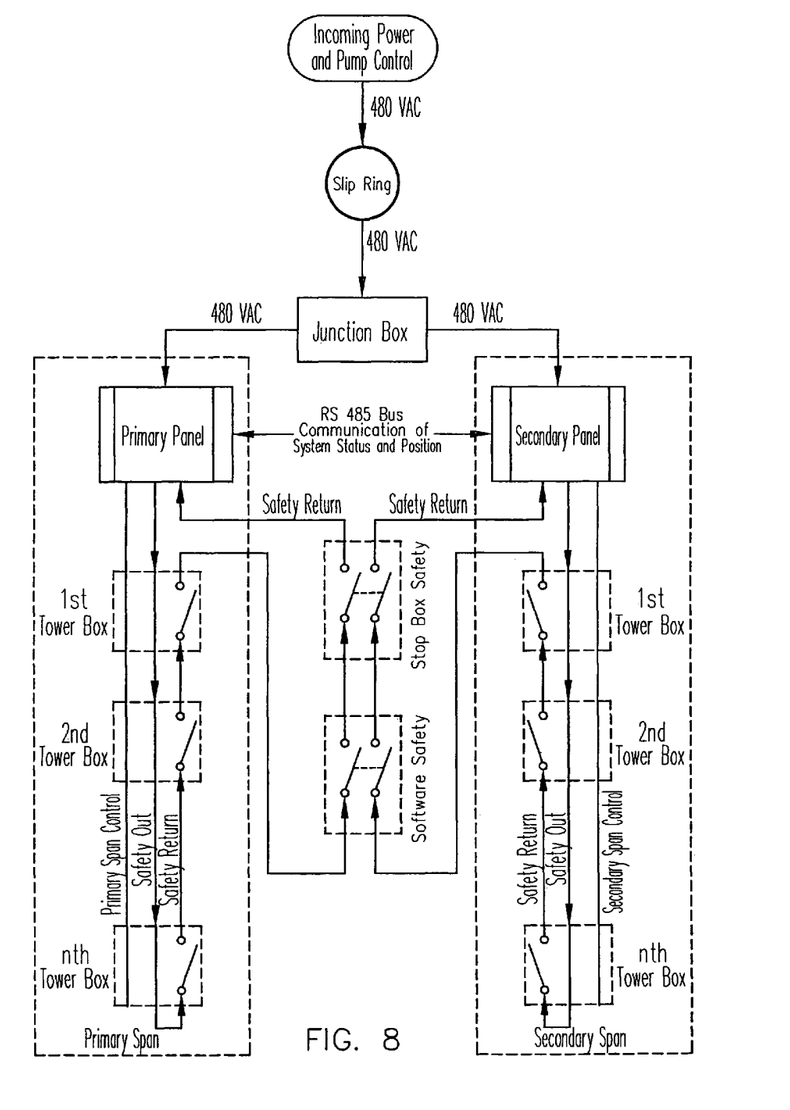
FIG. 8 is a top level wiring diagram of the system.

A primary control feature of the two span structures is the safety system (FIG. 8) used to ensure the two structures do not collide with each other. The safety system consists of two independent safeties:

Safety #1—A software program residing in control panels 54 and 52. Based on the angular readings from resolvers 58 and 60, the software programs of control panels 54 and 52 continually pass each other, via a serial communications bus, the position of their span structure. The software programs monitor the position of their span structure relative to the other span structure and shut the system down by removing power should the safety angle or minimum distance between the two span structures be reached.

Safety #2—A Stop Box Safety consisting of a position proximity switch 100 is mounted on the lower end of a conventional elbow connector 22. The actuation device 101 of the Stop Box Safety is located on the upper end of the T-shaped connector 16, whereby the position proximity switch will shut the system down by removing power should the actuation device 101 activate the Stop Box position proximity switch.

It can therefore be seen that the center pivot irrigation system of this invention includes the necessary controls and safeties to ensure that the span structures will be efficiently, safely and precisely controlled to achieve the proper watering of the seeds.

Thus it can be seen that the invention accomplishes at least all of its stated objectives.

We claim:

1. A center pivot irrigation system, comprising:
a center pivot structure including a vertically extending water supply pipe having upper and lower ends;
a swivel structure rotatably mounted on said water supply pipe and being in fluid communication therewith;
a first center pivot span structure secured to said swivel structure and extending outwardly therefrom;
said first center pivot span including a first water delivery pipe supported upon one or more self-propelled drive units;
a second center pivot span structure secured to said swivel structure and extending outwardly therefrom;
said second center pivot span structure including a second water delivery pipe supported upon one or more self-propelled drive units;
said first center pivot span structure being independently movable by the associated drive units in either a forward direction or a rearward direction;
said second center pivot span structure being independently movable by the associated drive units in either a forward direction or a rearward direction; and
a control mechanism which senses the included angle between said first and second center pivot span structures and which is electrically connected to said drive units on said span structures to enable total independent operation of said first and second span structures whereby said first and second span structures may be moved in different directions relative to each other, at different speeds.

* * * * *